Patented July 13, 1937

2,087,059

UNITED STATES PATENT OFFICE 2,087,059

PROCESS FOR FERMENTING SUGAR-CONTAINING LIQUIDS

Ernst Kottlors, Mannheim, Germany

No Drawing. Application February 13, 1935, Serial No. 6,383. In Germany April 14, 1932

3 Claims. (Cl. 195—82)

This invention relates to a new, efficient process for fermenting sugar-containing liquids in the propagation of yeast. It is one object of the invention favourably to influence or to increase the growth and the vitality of the yeast; a further consequent object of the invention is either to effect a diminution of the pitching yeast necessary for the fermentation, or, with the same quantity of pitching yeast as has hitherto been customary, to produce a substantial increase in the yeast yield.

In the known fermentation processes for producing yeast with progressive growth of the yeast, that is to say when operations are carried out with a higher growth factor, weakening of the growing yeast cells takes place; the consequence of this is that the yeast industry has to be content with a growth which in general is 5-7 fold, so that therefore if a quantity of yeast equal to a hundred units by weight or volume is to be present in the production vat, that is to say in that vat in which the ripened or matured yeast which is in a condition for being used occurs, a quantity of pitching yeast amounting to 20 to 15% must be used.

The present invention shows that it is possible to operate with far smaller quantities of pitching yeast without impairing the yield if special growth promoting bodies, namely hormones, are used. These hormones are added in a definite quantity in the course of the process to the growing yeast in the fermentation vat after a definite generation or cultivation time.

As examples of hormones which increase the growth of the yeast and the vitality thereof may be mentioned: the standardized ovarial hormone, the growth promoting fraction of the pituitary anterior lobe, auxine, which forms the growth substance of the wheat germ.

Experiments with ovarial hormone have shown that not only is an increase in the growth capability attained, but also an enhancement of the otherwise decreasing fermentation power and stability of the yeast, as well as greater growth factors.

It is a further part of the invention that the addition of hormone is necessary only once during the whole time of growth and yet maintains a growth promoting influence over the whole duration of the same.

Two parallel experiments are set forth below in illustration of the invention:

*Experiment 1.—Without hormone addition*

2 kg. of pitching yeast are to be cultivated to form 128 kg. of saleable yeast. The normal growth time for a doubling of the quantity amounts to three hours, and consequently the 2 kg. would have to have 18 hours to increase to 128 kg. The maximum supply of air per hour was 128 cbm. in the last hour; the quantity of mash amounted to 5 cbm. The addition of air in the first hour was 5 cbm. and the quantity of mash amounted to 500 litres and was increased by a uniform supply of water and nutrient solution to 5 cbm. 128 kg. of molasses were added, 2.2 kg. of pure nitrogen in the form of ammonia water, 1.2 kg. of pure phosphoric acid in the form of superphosphate. After twelve hours it was already found that the growth of yeast was only 30 kg. instead of 32 kg. and as the ultimate result 90 kg. were obtained, that is to say in the fourth generation or cultivation a weakening of the yeast occurred. The total yield amounted then to about 72% of the molasses employed.

*Experiment 2.—With hormone addition*

The experiment was repeated but in the twelfth hour, that is to say during the fourth generation or cultivation, about 30,000 mouse units of standardized ovarial hormone were added. The final result was 132 kg. of yeast, which corresponds to a yield of 103% of yeast. Both as regards raising power as well as stability this yeast differed substantially from the yeast of Experiment 1; the raising power of the yeast with hormones amounted for example to 59 minutes, and that without hormone addition to 76 minutes, under equal experimental conditions and referred to the same flour. The albumen content of the yeast without hormones was 57%, and that with hormones 50%. The mash of the yeast with hormone addition showed no alcohol, whilst the mash of the yeast with no hormone addition had 2.5% of alcohol by volume, an indication of the fact that the intensity of the yeast growth without hormone addition, which already showed a weakening in the fourth generation or cultivation, had been substantially weakened further. The action of the addition of the growth hormone was shown beyond doubt by earlier small scale laboratory experiments analogous to Experiment 2.

The ripening time in each case amounted to two hours.

What I claim is:

1. Process for increasing the growth of yeast in sugar-containing solutions, consisting in adding, while the yeast is in growing state, to approximately 2 kgs. growing yeast ovarial hormones of approximately 30,000 mice units, by introducing them into the fermenting liquid.

2. Process for increasing the growth of yeast in sugar-containing solutions, consisting in introducing, while the yeast is in growing state, at the beginning of the weakening of the growing yeast ovarial hormones of approximately 30,000 mice units to 2 kg. pitching yeast into the fermenting liquid.

3. Process as claimed in claim 1, consisting in introducing, while the yeast is in growing state, during the fourth generation ovarial hormones of approximately 30,000 mice units to 2 kgs. pitching yeast into the fermenting liquid.

ERNST KOTTLORS.